United States Patent [19]

Sams et al.

[11] Patent Number: 4,488,102

[45] Date of Patent: Dec. 11, 1984

[54] ELECTRONIC SWITCH CONTROL METHOD

[75] Inventors: H. Wayne Sams, Syracuse; Nicholas Campitello, Kirkville, both of N.Y.

[73] Assignee: Carrier Corporation, Syracuse, N.Y.

[21] Appl. No.: 412,751

[22] Filed: Aug. 30, 1982

[51] Int. Cl.³ .............................................. H02P 7/36
[52] U.S. Cl. ................................................... 318/810
[58] Field of Search ................... 318/138, 254, 254 A, 318/810, 811, 705–707, 721–724, 807–809; 361/195

[56] References Cited

U.S. PATENT DOCUMENTS

| | | | |
|---|---|---|---|
| 731,996 | 6/1903 | Eichemeyer et al. | 318/781 |
| 3,210,631 | 10/1965 | Niccolls | 318/138 |
| 3,225,277 | 12/1965 | Foulger | 318/138 |
| 3,229,179 | 1/1966 | Hetzel | 318/138 |
| 3,333,171 | 11/1964 | Platnick | 318/138 |
| 3,849,718 | 11/1974 | Forster, Jr. | 318/138 X |
| 3,949,283 | 4/1976 | Okuyama | 318/138 X |
| 4,136,308 | 1/1979 | King | 318/138 X |
| 4,238,717 | 12/1980 | Knight | 318/138 X |
| 4,264,854 | 4/1981 | Hawtree | 318/809 |
| 4,290,108 | 9/1981 | Woehrle | 318/810 X |
| 4,313,075 | 1/1982 | Stewart | 318/722 |

OTHER PUBLICATIONS

NASA Tech. Brief 66-10355.
Theory and Calculations of Electrical Apparatus by Charles Steinmetz (McGraw-Hill Book Company, 1917), pp. 172-175, Chapter 11.

Primary Examiner—Stanley J. Witkowski
Assistant Examiner—Patrick Keane
Attorney, Agent, or Firm—David L. Adour

[57] ABSTRACT

A method for controlling a plurality of electronic switches employed to connect an alternating current voltage source with a motor. The method comprises the steps of generating a signal, directing the signal to each of a series of output lines in sequence, regularly repeating the directing step, conducting the signal from the output lines to the electronic switches to actuate the electronic switches, and continuously resynchronizing the directing of the signal with the voltage cycle of the voltage source.

1 Claim, 4 Drawing Figures

ELECTRONIC SWITCH CONTROL METHOD

BACKGROUND OF THE INVENTION

This invention generally relates to electronic switch controls, and more specifically to a method for controlling a plurality of electronic switches employed to connect a motor with an alternating current voltage source.

Single phase, alternating current electric motors have achieved extensive commercial acceptance in many applications, being relatively simple, economical, reliable, and versatile. For example, such motors are often used in refrigeration systems to drive the compressor of the system or to drive one or more of the system fans. Heretofore, individual motors of the general type described above have conventionally been designed to operate at one or, at most, a few discrete speeds. While these motors operate very satisfactorily under a large number of widely differing circumstances, it is nevertheless believed that they may be improved by providing a simple and economical motor control which may be effectively employed to vary the speed of a single phase, alternating current motor over a broad range of values, in a continuous, analog manner. Such a control would enable the motor to operate more efficiently by better matching the motor speed, and thus the power drawn by the motor, to the specific power demand placed thereon.

For this reason, efforts have recently been undertaken to develop a motor control employing a plurality of electronic switch pairs to connect a motor to an alternating current voltage source, and a switch control that actuates these switch pairs in a sequence and manner which develops and rotates a magnetic wave around the motor stator at an adjustable rate, thereby rotating the rotor of the motor at a variable speed. During the development of this motor control, it has been learned that for any given motor speed it is desirable to maximize the number of times that individual switch pairs are actuated as the voltage of the voltage source changes polarity, or passes through a zero voltage value.

SUMMARY OF THE INVENTION

In view of the above, an object of the present invention is to provide a method for controlling a plurality of electronic switch pairs, employed to connect a motor with an alternating current voltage source, which maximizes the number of times the switch pairs are actuated and deactuated at points in the voltage cycle of the power source where that voltage has a substantially zero magnitude value.

Another object of this invention is to synchronize and to resynchronize continuously the actuating of a plurality of electronic switch pairs, employed to connect a motor with an alternating current voltage source, with the voltage cycle of that voltage source.

These and other objectives are attained with a method for controlling a plurality of electronic switches employed to connect an alternating current voltage source with a motor, the method comprising the steps of generating a signal, directing the signal to each of a series of output lines in sequence, regularly repeating the directing step, conducting the signal from the output lines to the electronic switches to actuate the electronic switches, and continuously resynchronizing the directing of the signal with the voltage cycle of the voltage source.

DETAILED DESCRIPTION OF THE PREFERRED EMBODIMENT

Figure 1:
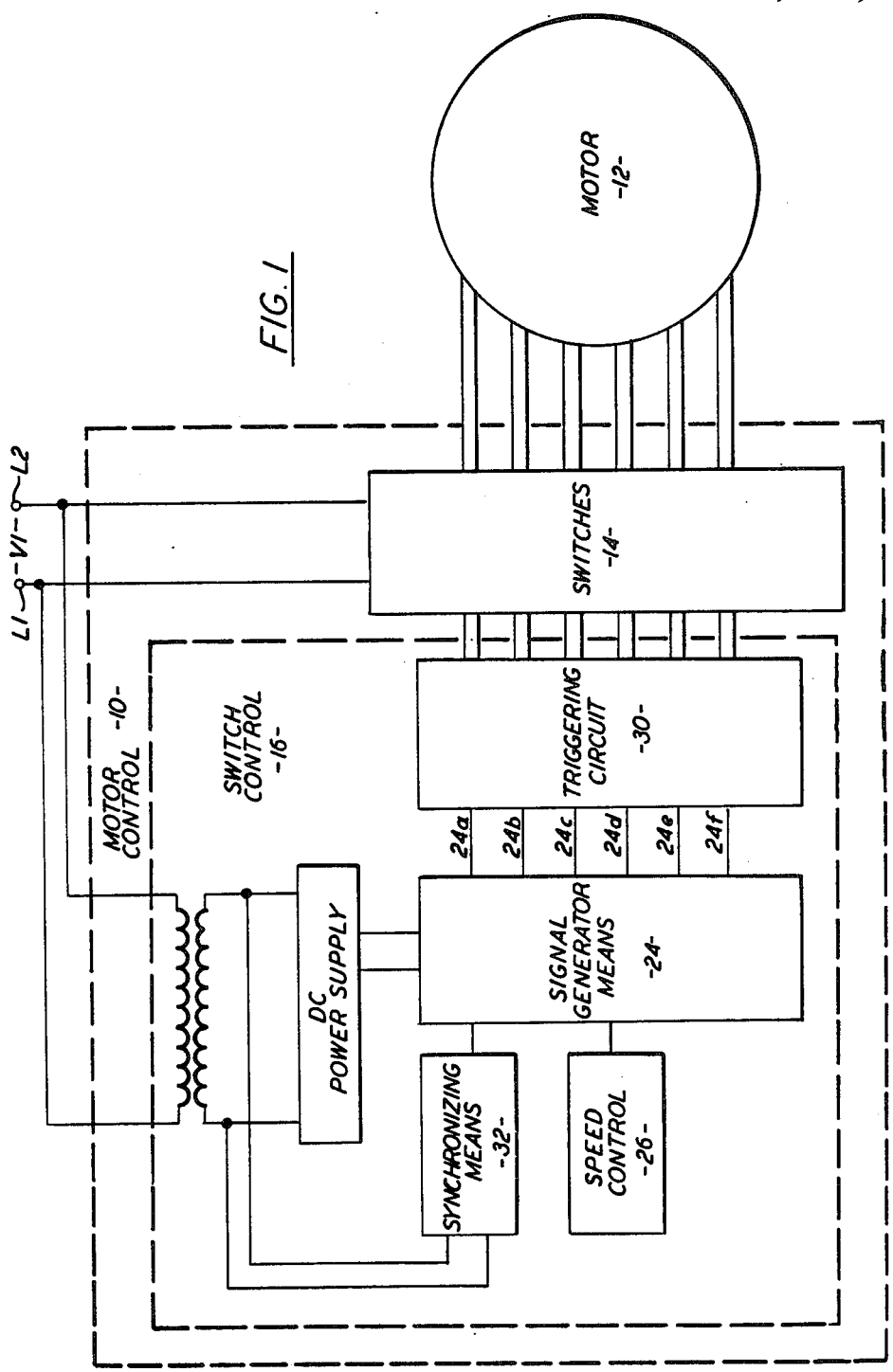
FIG. 1 is a block diagram generally showing a motor and a motor control with which the method of the present invention may be used.

FIG. 1 illustrates motor control 10 and motor 12, and generally motor control 10 includes a plurality of electronic switches 14 and switch control 16. More specifically, referring to FIGS. 1 and 2, switches 14 comprise a plurality of first electronic switches 20a through $f$ and a plurality of second electronic switches 22a through $f$; and preferably switch control 16 includes signal generator means 24, speed control means 26, triggering circuit 30, and synchronizing means 32.

Motor 12 is a single phase, alternating current motor preferably of the induction type, including a rotor 36 and a stationary, annular stator 40, which encircles the rotor. Stator 40 includes a plurality of stator windings and a plurality of diametrically opposed stator winding connections 42a through $f$. Motor 12 is designed for use with an alternating current electric voltage or power source V1 having first and second power lines L1 and L2. There are many well-known motors of the general type outlined above which may be employed in the practice of the present invention, and a detailed description of these motors is not needed herein.

Figure 2:
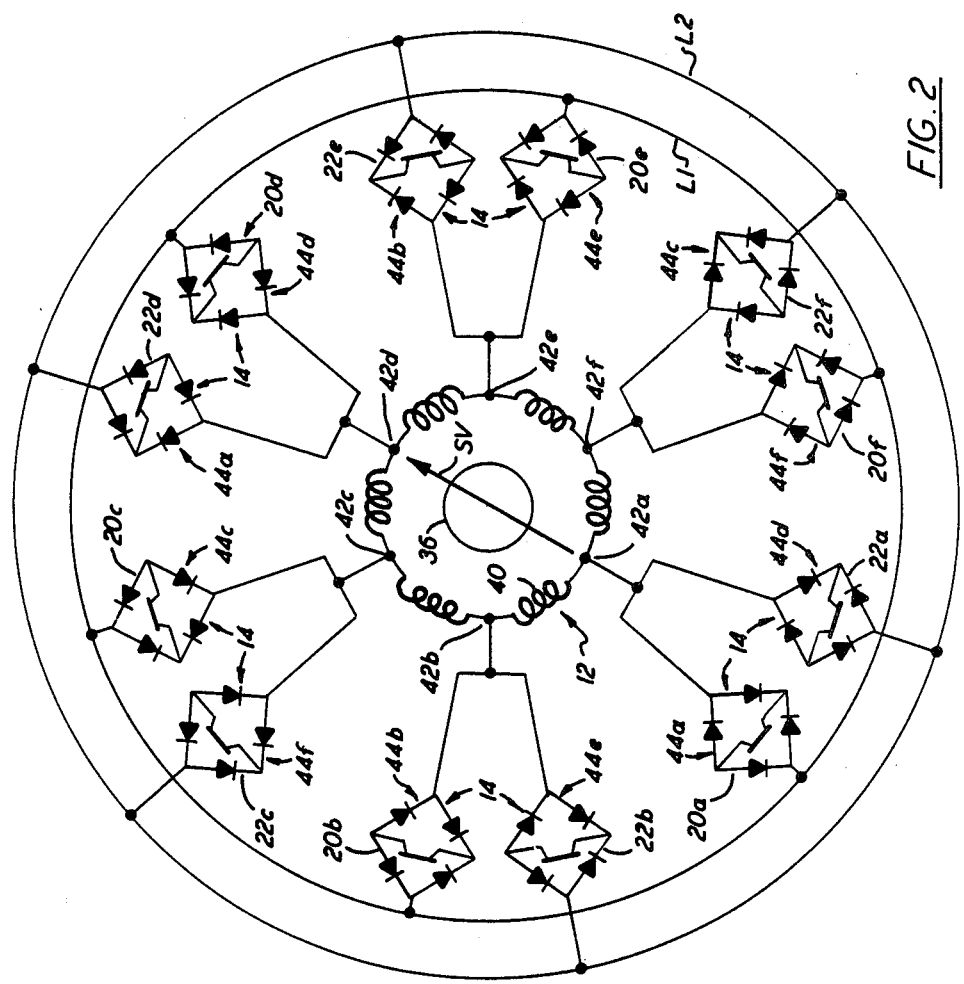
FIG. 2 is a more detailed diagram of the motor and electronic switches shown in FIG. 1, showing the manner in which the electronic switches connect the motor stator windings to first and second lines of an alternating current power source.

With particular reference to FIG. 2, first electronic switches 20a through $f$ are provided for connecting stator winding connections 42a through $f$ with line L1, and are electrically arranged in parallel between the stator winding connections and line L1, in an annular or circumferential sequence around the stator, with a different first electronic switch electrically located directly between each stator winding connection and line L1. Thus, switch 20a is directly located between stator winding connection 42a and line L1; and switches 20b, c, d, e and $f$ are directly located between line L1 and stator winding connections 42b, c, d, e and $f$ respectively. Second electronic switches 22a through $f$ are provided for connecting stator winding connections 42a through f with line L2, and are electrically arranged in parallel between stator 40 and line L2, also in an annular or circumferential sequence around the stator, and with a different second electronic switch electrically located directly between each stator winding connection and line L2. Thus, switch 22a is directly located between line L2 and stator winding connection 42a; while switches 22b, c, d, e and $f$ are directly located between line L2 and stator winding connections 42b, c, d, e and $f$ respectively.

As described above, electronic switches 14 form a plurality of electronic switch pairs 44a through $f$. Each switch pair 44a through $f$ includes the first electronic switch directly located between line L1 and a selected stator winding connection and the second electronic switch directly located between line L2 and the stator winding connection diametrically opposite the selected stator winding connection. For example, switches 20a and 22d form switch pair 44a. Similarly, switches 20b and 22e form switch pair 44b, switches 20c and 22f form switch pair 44c, switches 20d and 22a form switch pair 44d, switches 20e and 22b, form switch pair 44e, and switches 20f and 22c form switch pair 44f.

Figure 3:
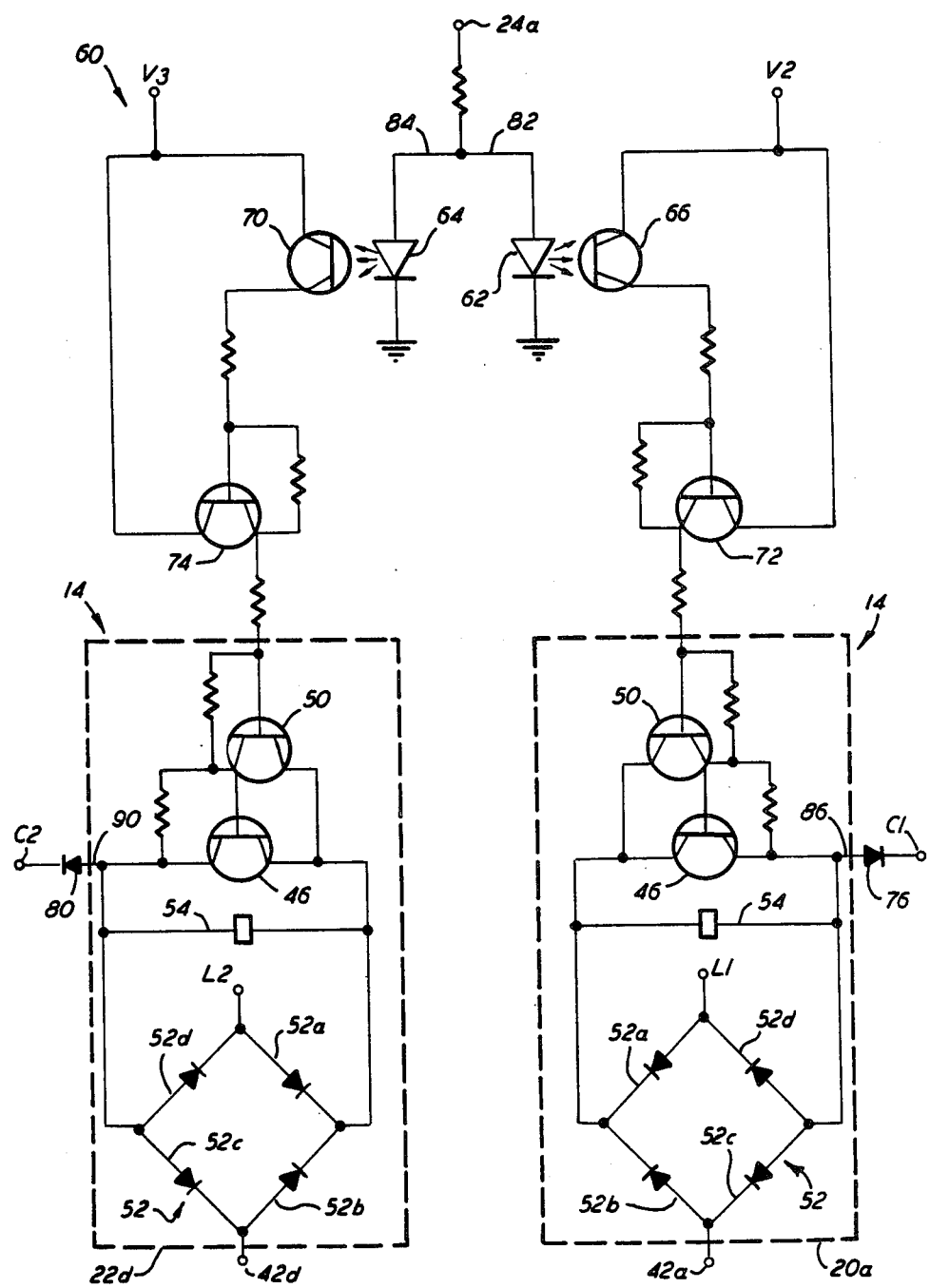
FIG. 3 shows a circuit diagram of portions of the triggering circuit illustrated in FIG. 1.

Various types of electronic switches may be employed in the practice of the present invention. For example, with reference to FIG. 3 which illustrates two electronic switches 20a and 22d, each electronic switch may comprise first and second transistors 46 and 50 and a diode bridge 52. Transistors 46 and 50 may be conventional NPN transistors with the emitter of the latter connected to the base of the former, forming a transistor pair commonly referred to as a Darlington couple. Diode bridge 52 includes diode legs 52a, b, c, and d. Legs 52a and b are directly connected together and to the collectors of both transistors 46 and 50, legs 52b and c are directly connected together and to a selected stator winding connection, legs 52c and d are directly connected together and to the emitter of transistor 46, and legs 52d and a are directly connected together and to a selected power line. Preferably transistor 46 and 50 of each electronic switch 14 are provided with a snubber circuit 54 to reduce the instantaneous voltage drop across these transistors as the transistors are deactuated. In assembly, the various elements of electronic switches 14 may be connected together, to stator winding connections 42a through f, and to power lines L1 and L2 in a conventional manner.

Switch control 16 is provided to actuate each first electronic switch 20a through f in a predetermined sequence and for an adjustable length of time, to actuate each second electronic switch 22a through f of each switch pair 44a through f for an adjustable length of time with actuation of the first electronic switch of the same switch pair, and to vary the adjustable lengths of time. Preferably, the predetermined sequence in which switch control 16 actuates first electronic switches 20a through f is their annular sequence around stator 40. More particularly, signal generator means 24 includes a series of output lines 24a through 24f and is employed to generate a signal and to direct this signal to each output line 24a through f in sequence and for an adjustable length of time. That is, the generated signal is directed to a first output line such as line 24a, then is directed to the second output line 24b in the sequence, and then is directed to the third output line 24c in the sequence.

This pattern continues until the signal has been directed to each of the output lines in the sequence, after which the entire sequence is regularly repeated. In this sequence, the signal from generator means 24 is directed to each output line 24a through f for an adjustable length of time; and preferably, although not necessarily, within the sequence, the signal is directed to the output lines for equal—albeit adjustable—lengths of time. Preferably the output signal from generator means 24 is a continuous, uninterrupted signal such as a direct current voltage and is continuously directed to each output line 24a through f for the entire adjustable length of time. Also, while the directing of the signal from generator means 24 to each output line 24a through f may be terminated immediately upon the directing of that signal to the next output line in the sequence, preferably the signal from the signal generator means is directed to each output line for a brief period of time immediately after the start of the directing of the signal to the next output line in the sequence.

Speed control means 26 is provided to vary the adjustable lengths of time the signal from generator means 24 is directed to each output line 24a through f in the sequence. Speed control means 26 may take several forms. For example, if signal generator means 24 is designed to generate a series of pulse currents and to direct each successive pulse current to a different output line 24a through f in sequence, speed control means 26 may be designed to vary the period between successive pulse currents. With the specific generator means 24 outlined above, though, speed control means 26 is employed to change the length of time the signal of the generator means is continuously directed to each output line 24a through f.

Triggering circuit 30 is provided to conduct the signal from output lines 24a through f of signal generator means 24 to electronic switches 20a through f and 22a through f to actuate these switches. Preferably, triggering circuit 30 includes a plurality of identical subcircuits, with each of these subcircuits connecting a different switch pair 44a through f with signal generator means 24. Since these subcircuits are identical, only one, schematically illustrated in FIG. 3 and broadly referenced as 60, will be described in detail. Generally, subcircuit 60 comprises optical diodes 62 and 64, optical transistors 66 and 70, amplifying transistors 72 and 74, diodes 76 and 80, and common connections C1 and C2.

Subcircuit 60 is connected to output line 24a of signal generator means 24 and is provided with two parallel branch lines 82 and 84. Light emitting diodes 62 and 64 are located in branch lines 82 and 84 respectively, in series between signal generator means 24 and a ground connection. The emitter of transistor 66 is connected to the base of transistor 72, and the emitter of the latter transistor is connected with the base of transistor 50 of first electronic switch 20a. Similarly, the emitter of transistor 70 is connected to the base of transistor 74, and the emitter of the latter transistor is connected with the base of transistor 50 of second electronic switch 22d.

A common line 86 is connected to common connection C1 and to the emitters of both transistors 46 and 50 of first electronic switch 20a, and common line 90 is connected to common connection C2 and to the emitters of both transistors 46 and 50 of second electronic switch 22d. Common connection C1 is connected to the transistors 46 and 50 of each first electronic switch 20a through f and is provided to complete the triggering circuits for the transistors 46 and 50 of these switches. Similarly, common connection C2 is connected to transistors 46 and 50 of each second electronic switch 22a through f and is provided to complete the triggering circuits for the transistors 46 and 50 of these switches. Diodes 76 and 80 are located in common lines 86 and 90 to block the conduction of a positive current from common connections C1 and C2 to the emitters of the transistors of the first and second electronic switches respectively. Direct current voltage sources V2 and V3 are provided for powering transistors 66, 70, 72 and 74. Specifically, the emitter and collector of transistor 66 are connected in series between power source V2 and common connection C1, as are the emitter and collector of transistor 72; and the emitter and collector of transistor 70 are connected in series between power sources V3 and common connection C2, as are the emitter and collector of transistor 74.

With subcircuit 60, the output from line 24a is conducted through diodes 62 and 64, causing those diodes to emit light. Light from diodes 62 and 64 is directed onto the bases of optical transistors 66 and 70, causing a current to flow from the base to the emitter of each of these transistors. This, in effect, switches transistors 66 and 70 into an actuated, current conductive state, allowing current to flow from power sources V2 and V3, through transistors 66 and 70, to the bases of transistors 72 and 74. Transistors 72 and 74 amplify these currents, and amplified currents are conducted to the bases of transistors 46 and 50 of both electronic switches 20a and 22d, actuating these electronic switches and, thus, allowing current to pass through electronic switch 20a between line L1 and stator winding connection 42a and through electronic switch 22d between line L2 and stator winding connection 42d. A shunt resistor is provided between the base and emitter of transistor 72 to facilitate switching that transistor into a nonconductive state once current flow to the base of the transistor is terminated. Similarly, shunts are provided between the bases and emitters of transistors 74, 46, and 50 to facilitate turning off these transistors.

With the above arrangement, each switch pair 44a through f is actuated when, and remains conductive as long as, the signal of generator means 24 is directed to the output line 24a through f associated with the switch pair, and the switch pair is deactuated when the directing of the signal of the signal generator means to the associated output line is terminated. As discussed in detail below, by varying the frequency with which switch pairs 44a through f are so actuated and deactuated, the speed of rotor 36, and thus of motor 12, may be varied over a broad range of values.

It has been learned that, for any given motor speed, it is desirable to maximize the number of instances that switch pairs 44a through f are actuated as the voltage of power source V1 changes polarity, or passes through a zero magnitude value. In particular, it is preferred to begin the cycling of switch pairs 44a through f at a point in time at which the instantaneous voltage of power source V1 passes through a zero voltage value, and to actuate successive switch pairs at a frequency that is a comparatively simple fraction or a whole number multiple of the frequency of a half voltage cycle of power source V1, for example $\frac{1}{3}$, $\frac{1}{2}$, $\frac{2}{3}$, or $\frac{3}{4}$ of or 1, 2, 3 or 4 times that frequency.

This, of course, requires synchronizing the directing of the signal generated by signal generator means 24 to output lines 24a through f with the voltage cycle of power source V1, and synchronizing means 32 is provided for this reason. Synchronizing means 32 may take the form of a conventional zero cross sensor connected to signal generator means 24 and to power lines L1 and L2. In particular, sensor 32 senses the instantaneous voltage of the current conducted through lines L1 and L2 and generates a signal each time the instantaneous voltage of this current crosses or passes through a zero magnitude value. This signal, as more fully explained below, is employed to synchronize and to continuously resynchronize the directing of the signal generated by signal generator means 24 with the voltage cycle of power source V1.

Preferably, a microprocessor is employed as signal generator means 24. The microprocessor is programmed to receive input from speed control means 26 and synchronizing means 32, to generate a continuous direct current voltage signal, to direct this current signal to output lines 24a through f in sequence, and to continuously resynchronize the directing of that signal with the voltage cycle of voltage source V1. One program for accomplishing this result is illustrated by the flow chart shown in FIG. 4. This program involves seven variables identified as OUTPUT, TIME DELAY PERIOD, TDP COUNT, TIME, ZERO CROSS, ZC COUNT, and RESYNCH.

The OUTPUT variable identifies an output line 24a through f of microprocessor 24 to which the current generated thereby is directed, and this variable is advanced through the sequence 24a, 24b, 24c, 24d, 24e, and 24f. TIME DELAY PERIOD is an externally controlled parameter that determines a basic, variable unit of time, and TDP COUNT is an internal counting variable which keeps track of the passage of these basic time units. TIME is an externally controlled parameter governed by speed control means 26 that, together with TDP COUNT, determines the frequency with which the current generated by microprocessor 24 is directed through the sequence of output lines 24a through f.

ZERO CROSS senses the output from voltage sensor 32, is in an on state when there is an output from that sensor, and is in an off state when there is no output therefrom. ZC COUNT is another internal counting variable which counts the number of times the voltage of power source V1 has crossed a zero voltage magnitude since the directing of the signal of signal generator means 24 was last synchronized therewith. RESYNCH is an externally controlled factor that determines, in combination with ZC COUNT, how frequently the directing of the signal of generator means 24 is synchronized with the voltage cycle of power source V1.

Figure 4:
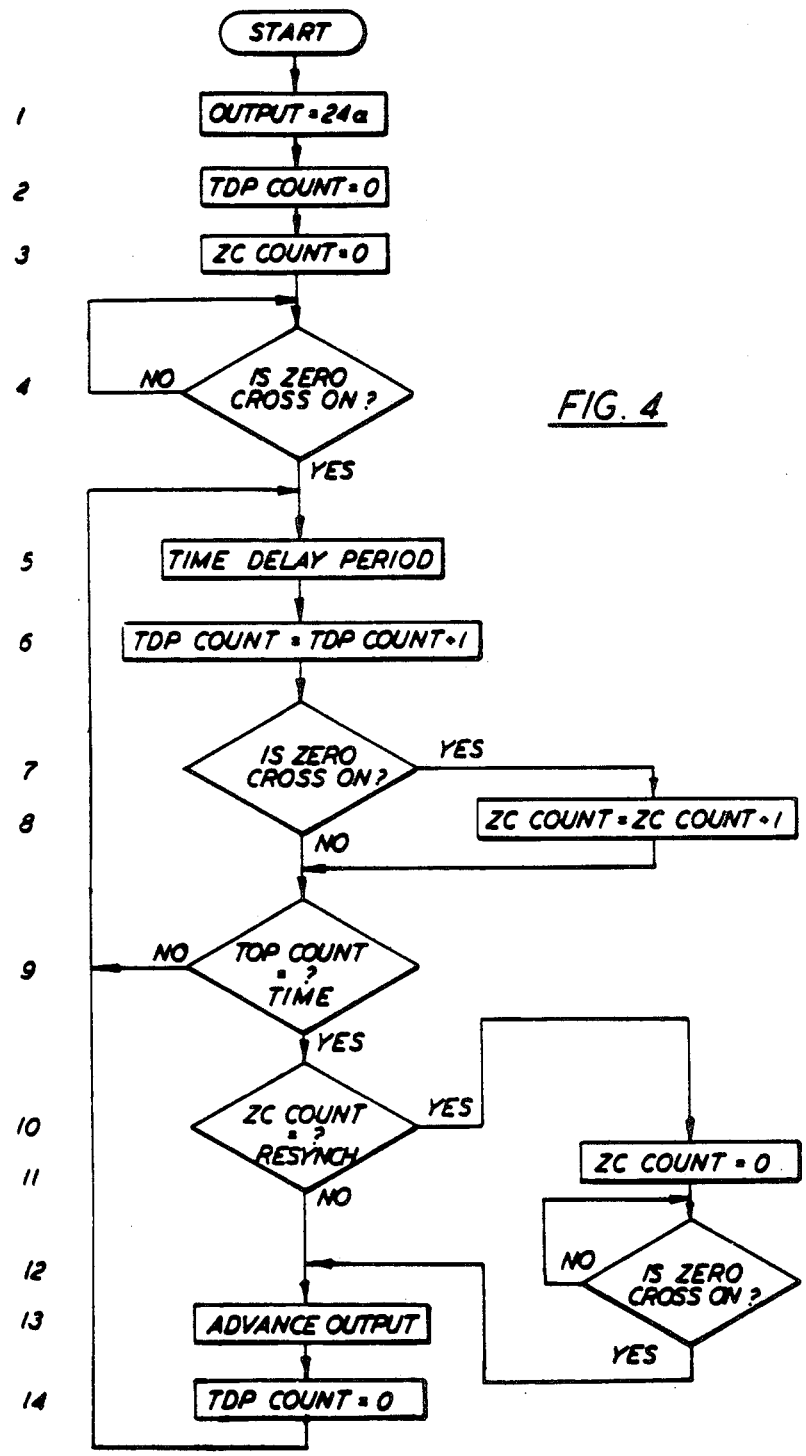
FIG. 4 illustrates a flow chart for a program for the signal generator means shown in FIG. 1 and which may be used to practice the method of the present invention.

The various steps in the program represented in FIG. 4 are identified by number immediately to the left of the flow chart. The first steps in this program are to set OUTPUT at 24a, and to set TDP COUNT and ZC COUNT at zero. Then, the start of the directing of the signal of microprocessor 24 is synchronized with the voltage cycle of power source V1. In particular, at step 4 of the program, ZERO CROSS is sensed. If ZERO CROSS is off, step 4 is repeated and continues to be repeated until ZERO CROSS is on. When ZERO CROSS is on, the program moves on to steps 5, 6 and 7. Step 5 starts a TIME DELAY PERIOD which briefly interrupts progress of the program for that basic unit of time. Once this time period passes, TDP COUNT is increased by one and ZERO CROSS is again sensed. If ZERO CROSS is off, the program skips to step 9; and if ZERO CROSS is on, ZC COUNT is increased by one, and then the program proceeds to step 9.

At step 9, TDP COUNT is compared to TIME. If TDP COUNT is unequal to TIME, the program returns to step 5 and continues therefrom. Thus, TIME DELAY PERIOD is regularly repeated, with TDP COUNT keeping track of the number of these repetitions and ZC COUNT keeping track of the number of times the voltage of power source V1 passes through a zero voltage value. It should be noted that ZERO CROSS is on, not only at the exact moment that the voltage of power source V1 crosses through a zero voltage value, but also for a brief time thereafter so that, if a zero voltage crossing occurs during a particular TIME DELAY PERIOD, ZERO CROSS is on and ZC COUNT is increased by one immediately after the termination of that particular TIME DELAY PER- IOD. After a predetermined number of TIME DELAY PERIODs, specifically, when TDP COUNT equals TIME, the program moves on to steps 10 through 14.

Step 10 is to compare ZC COUNT with RESYNCH. If ZC COUNT is unequal to RESYNCH, OUTPUT is advanced to the next OUTPUT in the sequence, causing the signal of microprocessor 24 to be directed to the next output line 24a through $f$ in the sequence. Then TDP COUNT is reset at zero, and the program returns to step 5 and continues therefrom, starting a new TIME DELAY PERIOD and restarting the TDP COUNT cycle. On the other hand, if at step 10, ZC COUNT equals RESYNCH, the directing of the signal of microprocessor 24 is resynchronized with the voltage cycle of voltage source V1. Specifically, if ZC COUNT equals RESYNCH, ZC COUNT is set at zero and the program pauses, if necessary, until the voltage of power source V1 crosses a zero magnitude value, at which point, OUTPUT is advanced, which causes the signal of microprocessor 24 to be directed to the next output line 24a through $f$ in the sequence.

Then TDP COUNT is reset at zero, and the program is returned to step 5 to start a new TIME DELAY PERIOD and new TDP COUNT and ZC COUNT cycles. Steps 5 through 14 are continuously repeated until manually terminated, for example by deactuating microprocessor 24. As noted above, preferably the signal from signal generator means 24 is directed to each output line 24a through $f$ for a brief period of time immediately following the start of the directing of the signal to the next output line in the sequence. Hence, the signal of generator means 24 is directed to each output line 24a through $f$ not only as long as the output line is identified by the OUTPUT variable, but also for a brief length of time immediately thereafter.

With the above program, the period the OUTPUT variable normally remains constant, p, is given by the equation:

$$p = (TIME)(TIME\ DELAY\ PERIOD) \qquad (1).$$

Consequently, of course, the frequency at which the OUTPUT variable changes, which is also the frequency at which switch pairs 44a through $f$ are actuated, f(sp), is determined by the equation:

$$f(sp) = 1/[(TIME)(TIME\ DELAY\ PERIOD)] \qquad (2).$$

Clearly, this frequency may be adjusted by changing either one or both of the variables TIME and TIME DELAY PERIOD.

As will be appreciated by those skilled in the art, the actual TIME DELAY PERIOD will typically be slightly different from its nominal value, for instance there may be a variation of plus or minus a few microseconds between these actual and nominal values. Because of this difference, over an extended period of time, an appreciable difference may develop between the nominal and actual points in the voltage cycle of power source V1 at which the actuation of switch pairs 44a through $f$ occurs. If these nominal points are chosen, as they preferably are, to maximize the number of times that switch pairs 44a through $f$ are actuated when the voltage of power source V1 has an approximately zero magnitude value, it can be seen, then, that the difference between the nominal and actual values of TIME DELAY PERIOD reduces the number of times that the switch pairs are actuated at those points in the voltage cycle of the power source. In accordance with the present invention, however, the continuous resynchronization of the directing of the signal generated by signal generator means 24 with the voltage cycle of power source V1, which is provided for by steps 10 and 12 of the program shown in FIG. 4, effectively prevents any appreciable discrepancy from developing between the nominal and actual points in the voltage cycle of power source V1 at which switch pairs 44a through $f$ are actuated, substantially facilitating efforts to maximize the number of instances where these switch pairs are actuated at approximately zero voltage values of the power source.

This resynchronization of signal generator means 24 with power source V1 occurs at points in time when the directing of the signal of the signal generator means is first directed to an output line 24a through $f$ in the sequence thereof, and the resynchronization is done by periodically initiating the directing of the signal to an output line in response to the voltage of V1 passing through a zero magnitude value. It is desirable to check the synchronization of signal generator means 24 at points in the voltage cycle of power source V1 where, if the signal generator means has remained synchronized with the voltage cycle, that voltage has a zero magnitude. This is preferred because, first, otherwise the directing of the signal of signal generator means 24 through the sequence of output lines 24a through $f$ would be delayed for a time even if that directing has remained synchronized with the voltage cycle of power source V1, and second, if the directing of the generated signal through the sequence of output lines has advanced only slightly ahead of the voltage cycle, the resynchronization of that directing requires only a very brief delay in the directing of the generated signal.

This consideration places constraints on the value of RESYNCH. In particular, the minimum RESYNCH value is the smallest whole number which yields a whole number when divided by the ratio:

$$[2][f(p)]/f(sp)$$

where:

f(p) = frequency of the power source, and
f(sp) = frequency with which switch pairs are actuated.

Of course, RESYNCH may be larger than this minimum value, but if the objective discussed immediately above is to be achieved, RESYNCH must be a whole number multiple of the minimum RESYNCH.

As is believed best understood with reference to FIG. 2, in the operation of motor 12, when a particular switch pair 44a through $f$ is actuated, a particular pair of opposed stator winding connections 42a through $f$ is directly connected to power lines L1 and L2; and as each subsequent switch pair 44a through $f$ is actuated in sequence, the next pair of opposed stator winding connections 42a through $f$ becomes directly connected to power lines L1 and L2. For example, when electronic switches 20a and 22d are actuated, stator winding connection 42a is directly connected to line L1 and stator winding connection 42d is directly connected to line L2; and when electronic switches 20b and 22e are actuated, stator winding connection 42b becomes directly connected to line L1 and stator winding connection 42e becomes directly connected to line L2. This operation of switch pairs 44a through $f$ can be represented by switch vector SV, shown in FIG. 2 and defined as extending from the stator winding connection that is directly connected to line L1, diametrically across stator 40, to the stator winding connection that is directly connected to line L2—even though, it should be noted, the potential of the former winding connection may be positive or negative relative to the potential of the latter winding connection.

As switch pairs 44a through f are actuated in sequence, the above-defined switch vector SV rotates around stator 40, completing one cycle each time the switch pairs 44a through f are actuated through one complete sequence or cycle, and the rotational frequency of switch vector SV, f(SV), is determined by the following equation:

$$f(SV)=(1/N)f(sp) \qquad (3)$$

where:
N = number of switch pairs in one complete cycle, and
f(sp) = frequency at which switch pairs are actuated.

Of course, as switch pairs 44a through f are actuated and pairs of opposed stator winding connections 42a through f are directly connected to power lines L1 and L2, a potential difference is developed across the stator windings. This potential difference causes a current to be conducted around stator 40, developing a magnetic flux wave thereacross. When the rotational frequency of switch vector SV is exactly equal to the frequency of the voltage cycle of the power current in lines L1 and L2, the magnetic flux wave developed across stator 40 is a standing wave because, at this synchronous frequency, during the period it takes for the voltage polarity between lines L1 and L2 to reverse—that is, a half period of the voltage cycle of the power current in lines L1 and L2—the stator winding connections directly connecting stator 40 to lines L1 and L2 are reversed. This matched reversing maintains the north pole of the instantaneous magnetic flux developed across stator 40 always on a first side thereof and the south pole of this instantaneous magnetic flux always on the opposed side of the stator.

This standing magnetic flux wave produces a force on rotor 36 but no torque, and consequently the rotor does not rotate. As the rotational frequency of switch vector SV is reduced below synchronous frequency, the magnetic flux wave across stator 40 begins to rotate around the stator, with the direction of the rotation of the flux wave being opposite to the direction of the rotation of the switch vector. This rotating magnetic flux wave produces both a force and a torque on rotor 36. As the rotational frequency of switch vector SV continues to decrease, the frequency of rotation of the magnetic flux wave increases, increasing the torque on rotor 36, and when the torque on the rotor is sufficient to overcome the starting load thereon, the rotor begins to rotate. The frequency of the rotating flux wave at which rotor 36 begins to rotate is referred to as the slip frequency of the rotor. Further decreasing the rotational frequency of switch vector SV increases the frequency of rotation of rotor 36 in a substantially linear manner. That is, the rotor frequency, f(r), is determined by the following equation:

$$f(r)=f(p)-f(s)-f(SV) \qquad (4)$$

where:
f(p) = power source voltage cycle frequency,
f(SV) = rotational frequency of the switch vector, and
f(s) = slip frequency of the motor.

Substituting the right hand side of equation (3) for f(SV) in equation (4), it can be seen that:

$$f(r)=f(p)-f(s)-(1/N)f(sp) \qquad (5),$$

and by substituting the right hand side of equation (2) for f(sp) in equation (5), it is apparent that:

$$f(r)=f(p)-f(s)-(1/N)(1/[(TIME)(TIME\ DELAY\ PERIOD)]) \qquad (6),$$

clearly relating the frequency of rotor 36 and the speed of motor 12 with the variable parameters of the program shown in FIG. 4. Thus, by gradually varying the TIME DELAY PERIOD variable of the program shown in FIG. 4, the rotational speed of rotor 36 may similarly be gradually varied, producing an analog or modulating variable speed single phase, alternating current motor.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:
1. A method for controlling a plurality of electronic switches employed to connect an alternating current voltage source with a motor, the method comprising the steps of:
generating a signal;
directing the signal to each of a series of output lines in sequence;
regularly repeating the directing step;
conducting the signal from the output lines to the electronic switches to actuate the electronic switches;
counting the number of times the voltage of the voltage source passes through a zero magnitude value; and
directing the signal to an output line in response to the voltage of the voltage source passing through the first zero magnitude value after passing through a preset number of zero magnitude values to maximize the number of times the electronic switches are actuated and deactuated at points in the voltage cycle of the voltage source where the voltage has a substantially zero magnitude value.

* * * * *